Oct. 28, 1941.　　　T. E. MURRAY　　　2,260,578
AUTOMOBILE CONSTRUCTION
Filed Jan. 6, 1940　　　4 Sheets-Sheet 1

INVENTOR.
THOMAS E. MURRAY
BY George T. Gill
ATTORNEY.

Oct. 28, 1941.  T. E. MURRAY  2,260,578
AUTOMOBILE CONSTRUCTION
Filed Jan. 6, 1940  4 Sheets-Sheet 2

INVENTOR.
THOMAS E. MURRAY
BY George F. Gill
ATTORNEY.

Oct. 28, 1941.　　　T. E. MURRAY　　　2,260,578
AUTOMOBILE CONSTRUCTION
Filed Jan. 6, 1940　　　4 Sheets-Sheet 3

INVENTOR.
THOMAS E. MURRAY
BY *George F. Gill*
ATTORNEY.

Oct. 28, 1941.  T. E. MURRAY  2,260,578
AUTOMOBILE CONSTRUCTION
Filed Jan. 6, 1940   4 Sheets-Sheet 4

INVENTOR.
THOMAS E. MURRAY
BY George T. Gill
ATTORNEY.

Patented Oct. 28, 1941

2,260,578

UNITED STATES PATENT OFFICE 2,260,578

AUTOMOBILE CONSTRUCTION

Thomas E. Murray, Brooklyn, N. Y.

Application January 6, 1940, Serial No. 312,653

5 Claims. (Cl. 293—55)

The invention herein disclosed relates to automobiles and more particularly to the construction of the end portions thereof.

An object of the invention is to provide a construction that is more readily adaptable to streamlining and that insures the necessary cooling air for the cooling system and the proper disposition of the exhaust gases. The invention contemplates utilizing the bumpers in conjunction with a gas chamber, the front bumper in conjunction with a chamber and passages for cooling air and the rear bumper in conjunction with a chamber and passages for the exhaust gases. Another object of the invention is to provide a construction in which the radiator construction may extend between the bumper and the body of the automobile and receive cooling air through the bumper. A further object of the invention is to provide a construction in which the bumper may be utilized in conjunction with the purification of exhaust gases.

These and other objects and certain advantages which will hereinafter appear are realized in the constructions, embodying the invention and constituting examples thereof, illustrated in the accompanying drawings in which.

Figure 1:
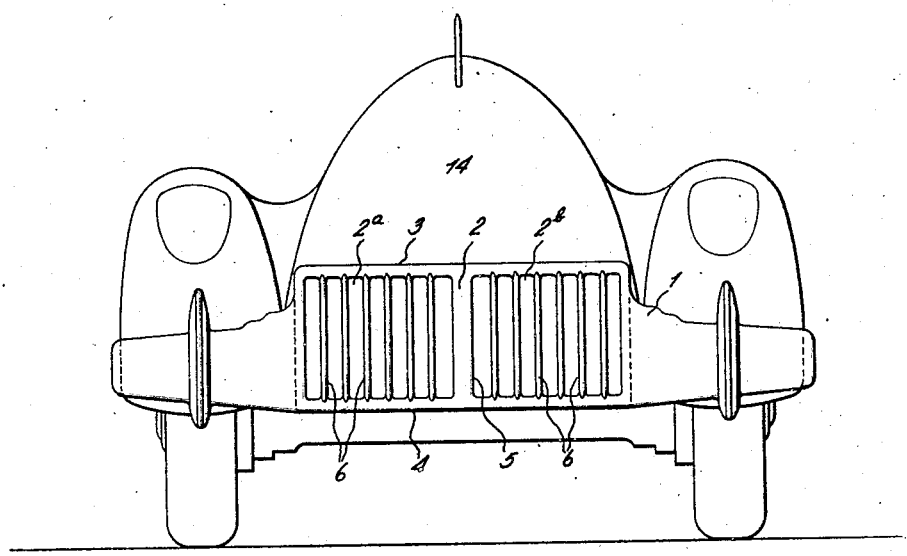
Fig. 1 is a front view of an automobile.
Figure 2:
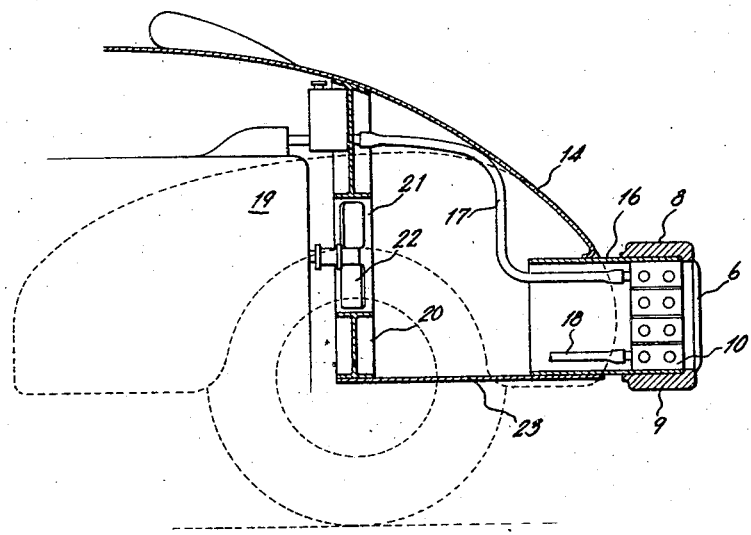
Fig. 2 is a partial longitudinal section of an automobile.
Figure 3:
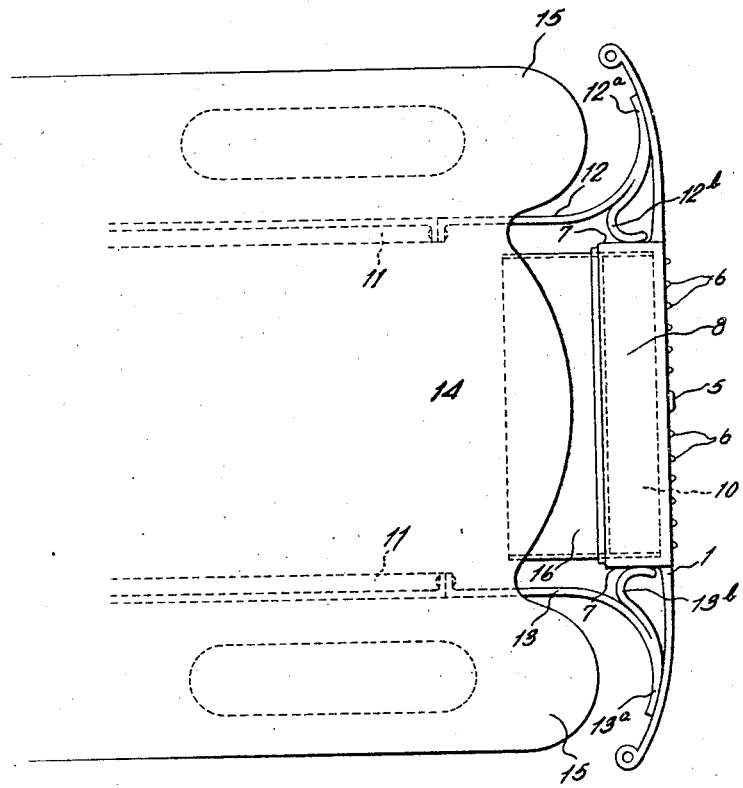
Fig. 3 is a plan of the same.

In Figs. 1 to 5 of the drawings, there is disclosed two automobile constructions in which the front bumper is utilized in conjunction with the radiator construction of the cooling system for the engine. In Figs. 1 to 3, the bumper construction includes a bumper 1 of a single integral, piece of metal that is somewhat heavier and stronger than the bumper now commonly used. The central portion 2 of the bumper, that portion which is in front of the hood and between the fenders, is wider than the remainder of the bumper. This portion of the bumper constitutes a radiator frame and includes two open sections 2a and 2b defined by upper and lower frame elements 3 and 4 respectively and a central dividing frame element 5. The open sections 2a and 2b are protected by grilles consisting of parallel bars 6. At the rear of the central portion of the bumper there are rearwardly extending end flanges 7, a top flange 8 and a bottom flange 9 forming a compartment or chamber for a radiator 10.

The bumper is supported from the chassis 11 of the automobile through flexible bumper supports 12 and 13, one at each end of the bumper. The flexible support 12 includes an arm 12a secured to the bumper at a point adjacent the end of the bumper and another arm 12b secured to the adjacent end of the radiator compartment. The support 13 is identical with the support 12 and includes an arm 13a secured to the bumper at a point adjacent the other end of the bumper and an arm 13b secured to the adjacent end of the radiator compartment. Through these bumper supports, the bumper is connected to the chassis and supported in spaced relation to the front of the car and so protects the hood 14 and fenders 15 of the automobile.

Between the radiator compartment and the hood, there extends a sheet metal tubular conduit 16, rectangular in end elevation. This conduit is open at both ends. At one end it extends into the radiator compartment of the bumper and surrounds the radiator 10 therein. At the opposite end, the conduit extends into an opening in the hood 14 and has a sliding or telescopic fit therein and so forms a compressible gas conduit between the bumper and the hood. In this way movement of the bumper relative to the car as by an impact flexing the supports 12 and 13 is taken up through the telescopic connection of the hood and conduit. The flexible hose connections 17 and 18 between the radiator and the engine, indicated at 19, and the radiator and the water pump (not shown) respectively pass through the conduit 16.

The hood 14 may be shaped as illustrated or may take any other shape in accordance with the design of the automobile. It may, however, in certain hood designs, be found desirable to provide a forward support for the hood. To this end, there is provided in the construction illustrated, a wall 20 having the section illustrated and a perimeter conforming to the shape of the hood. An opening 21 is provided through this wall and forms a housing for the fan 22 which draws air through the radiator. To secure the maximum effect of the fan and to protect the parts under the hood, a bottom plate 23, extending from the wall 20 is provided. This plate with the forward end of the hood forms a closed chamber or air passage. Thus all air moved by the fan will be drawn through the grille in the bumper and the radiator, passing to the motor through the air conduit 16 and the hood.

Figure 4:
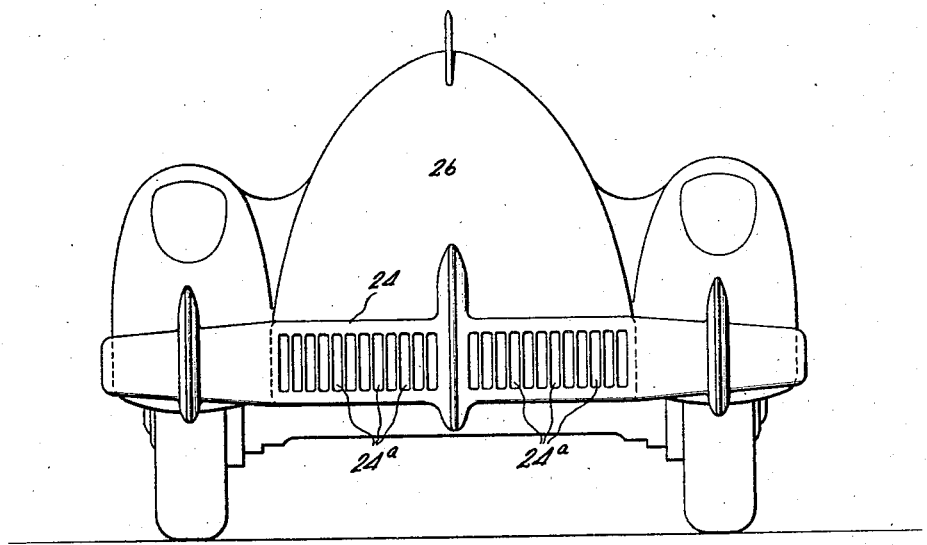
Fig. 4 is a front view of an automobile of modified form.
Figure 5:
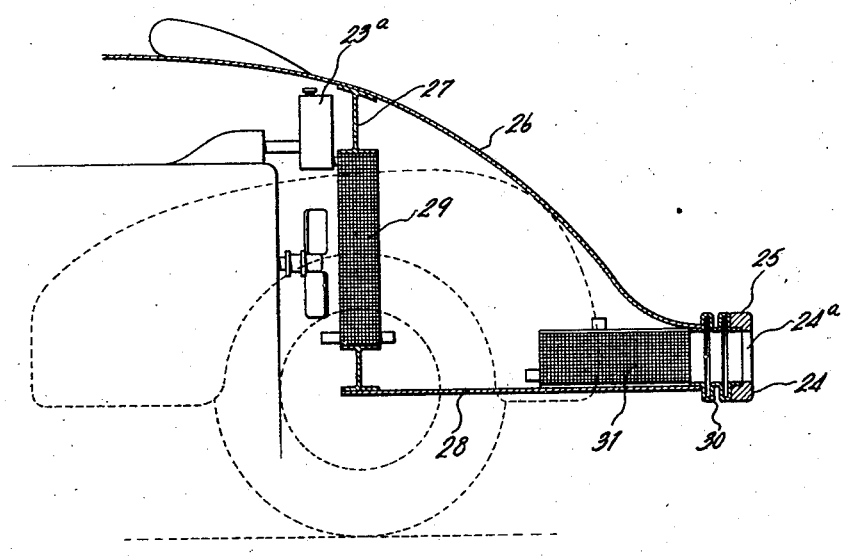
Fig. 5 is a partial longitudinal section of the same.

In Figs. 4 and 5 of the drawings, a different form of bumper and radiator construction is illustrated. In this construction the bumper 24 may be of substantially uniform width. Through the central portion of the bumper, there are a series of parallel spaced air passages 24a. At the rear of the central portion of the bumper, a circumambient, rearwardly extending flange 25 forms a compartment with which the air passages 24a communicate. The bumper is secured to and supported by the chassis through flexible supports such as those illustrated in Figs. 1 to 3.

Since the radiator is below the level of the top of the engine, it is desirable to provide a separate reservoir for the cooling liquid. Such a reservoir is indicated at 23a and may be secured to and supported by the wall 20 (Fig. 2). Into this reservoir, the liquid is discharged from the engine and it passes from the reservoir to the radiator. The reservoir is preferably provided with the usual overflow and the inlet for filling the cooling system and adding and renewing the liquid. Suitable provision, in accordance with common practice, is made for raising and lowering the hood and so permitting access to the engine and the reservoir.

In the construction illustrated in Figs. 4 and 5, the hood 26 slopes downwardly to a point adjacent the compartment at the rear of the bumper. Just in front of the engine, a wall 27 having a section as illustrated and a perimeter corresponding to the hood is supported by the chassis. From this wall a bottom wall 28 extends to the front of the hood and forms with the hood a closed passage from the narrow rectangular opening at the front of the hood to the wall 27. Mounted within the wall 27 is a radiator 29. All air passing through the opening at the front of the hood passes through the radiator 29.

Extending between the front of the hood and the bumper, there is a bellows-like, tubular, compressible air conduit 30 that is rectangular in end elevation. One end of the conduit 30 extends into and is secured in the compartment at the rear of the bumper. The other end of the conduit extends into the opening at the front of the hood and it is secured to the hood. Thus the conduit forms a compressible air passage between the bumper compartment and the hood such that all air passing through the air passages 24a passes into the hood and through the radiator 29.

Within the hood, adjacent the front end thereof, there may be an additional radiator 31 secured to and supported by the bottom wall 28. This radiator is preferably so positioned and of such dimensions that the end thereof abuts against the end of the member 30. In this way all the cooling air passing through the conduit 30 passes through the radiator. The radiators 29 and 31 may be used together or independently. If only the radiator 31 be used, the wall 27 will be constructed according to the wall 20 of Fig. 2. If both radiators be used they may be connected to the cooling system of the engine either in series or parallel relation.

Where the two radiators are employed, the radiator 29 may be used as a condenser to condense all water vapors or in winter anti-freeze solution vapors. In such an arrangement, a reservoir would be provided at the lower portion of the condenser 29 and the radiator may extend above the level of the top of the engine. The engine cooling system would discharge into the reservoir at the base of the condenser and the reservoir would be connected to the upper or inlet connection to the radiator 31. With this arrangement vapors rising from the reservoir will pass up through the condenser and into the reservoir. When the radiator 29 is thus used as a condenser, loss of anti-freeze solution through vaporization is avoided as are the obnoxious odors resulting from vaporized anti-freeze solution permeating the car.

Figure 6:
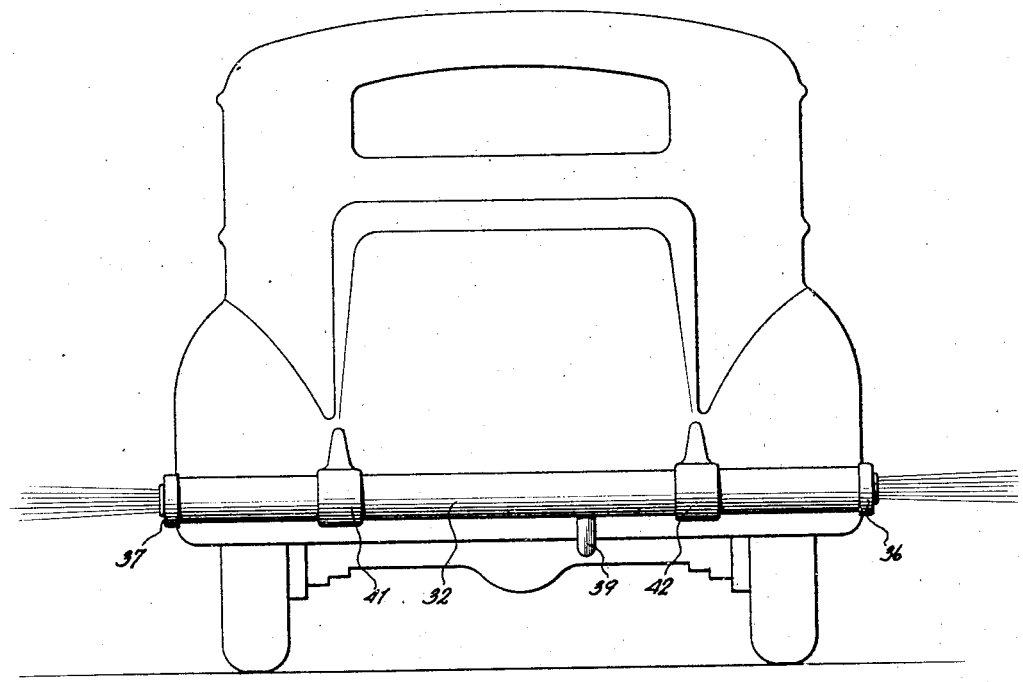
Fig. 6 is a rear view of an automobile.
Figure 7:
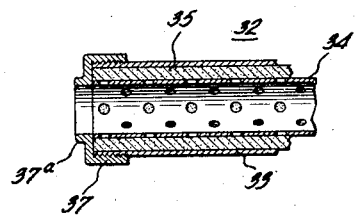
Fig. 7 is a partial longitudinal section of the bumper.
Figure 8:
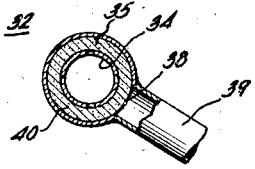
Fig. 8 is a transverse section of the bumper.

In the construction illustrated in Figs. 6 to 8, the rear bumper 32 forms a chamber for the exhaust gas from the engine. The bumper 32 includes an imperforate, external, tubular member 33 and a perforated, internal, tubular member 34, the two tubular members forming an annular chamber or compartment 35. The tubular members are held together, coaxially, by identical end caps 36 and 37. The cap 37 is threaded on the end of the tubular member 33 and includes a hub 37a in which the tubular member 34 is received. One of the end caps is removable for a purpose that will hereinafter appear. The other cap may be secured to the inner tubular member.

The outer tubular member has an opening 38 therethrough to which the exhaust conduit 39 is connected. The exhaust conduit 39 is bent and connected to the bumper at an angle to permit relative movement of the bumper without injury to the conduit. The chamber 35 is filled with a porous chemical material 40 for removing the obnoxious constituents of the exhaust gas. Exhaust from the engine passes into the annular chamber 35 through the chemical 40 and through the perforations in the wall of the inner tubular member 34. The gas, freed of the obnoxious constituents passes axially of the inner tubular member, out at the ends thereof and so to the atmosphere. The chemical 40 may be renewed at intervals by removing the removable end cap. The bumper is supported by the usual supporting brackets 41 and 42.

The chemical 40 may, of course, be omitted and the rear bumper, as constructed, be used as a muffler. In this case, the exhaust gases are released at the most rearward point, well beyond the body of the car. The gases are, therefore, not likely to get into the interior of the car as is often the case with present constructions particularly when the car is stopped and the engine running.

From the foregoing description of the embodiments of the invention illustrated in the drawings and described above, it will be seen that by this invention, there is provided a construction in which the bumpers are utilized to form compartments with gas passages. The front bumper provides a compartment and passages for air for the cooling system. With this construction the air is taken from the farthest forward point on the automobile. The rear bumper provides an exhaust gas purification chamber open to the atmosphere. The chamber is of sufficient volume and the passages of sufficient total area, that the purification of the exhaust gases may be effected with little or no increase in the back pressure on the engine. The constructions are such that the automobile is more readily designed and constructed in accordance with the accepted principles of streamlining.

In the claims the term body is used in a comprehensive sense and is intended to include the body and the hood.

It will be obvious that various changes may be made by those skilled in the art in the details of the embodiments of the invention illustrated in the drawings and described above within the principle and scope of the invention as expressed in the appended claims.

I claim:

1. In an automobile, the construction having an air intake at the extreme forward end of the automobile which construction comprises in combination an automobile body, a bumper having a compartment at the rear thereof and air passages extending through the forward wall thereof and communicating with the compartment, supports securing the bumper in position on the automobile and spaced from the forward end thereof, a substantially gas tight air conduit extending between the bumper and the hood and arranged to carry the air from the bumper compartment, and a radiator within the bumper compartment.

2. In a motor vehicle, the combination comprising a vehicle body, a motor enclosed thereby, a bumper relatively narrow as compared to its length, having gas passages therethrough and extending transversely of and spaced from the end of the body, supports securing the bumper in position on the vehicle, and a substantially gas tight conduit between the bumper and the body and forming a gas passage for the passage of gas between the motor and the bumper, whereby the bumper at the extreme end of the vehicle constitutes a terminus of a passage for gas between the atmosphere and the motor.

3. In a motor vehicle, the combination comprising a vehicle body including a hood having a downwardly and forwardly curving front panel, a bumper relatively narrow as compared to its length extending transversely of and spaced from the front end of the front panel of the hood having gas passages therethrough, supports securing the bumper in position on the vehicle, and a substantially gas-tight conduit extending between the bumper and the hood, whereby the bumper at the extreme forward end of the vehicle constitutes the intake for cooling air from the atmosphere to the motor.

4. In a motor vehicle, the combination comprising a vehicle body including a hood having a downwardly and forwardly curving front panel, a bumper relatively narrow as compared to its length extending transversely of and spaced from the front end of the front panel of the hood and having gas passages therethrough, supports securing the bumper in position on the vehicle, and a substantially gas-tight conduit extending between the bumper and the hood, whereby the bumper at the extreme forward end of the vehicle constitutes the intake for cooling air from the atmosphere to the motor, and a radiator arranged to receive the cooling air entering through the gas passages through the bumper.

5. In a motor vehicle, the combination comprising a vehicle body including a hood having a downwardly and forwardly curving front panel, a bumper relatively narrow as compared to its length extending transversely of and spaced from the front end of the front panel of the hood and having gas passages therethrough, supports securing the bumper in position on the vehicle, and a substantially gas-tight conduit extending between the bumper and the hood, whereby the bumper at the extreme forward end of the vehicle constitutes the intake for cooling air from the atmosphere to the motor, and a radiator within the hood and arranged to receive the cooling air entering through the gas passages through the bumper.

THOMAS E. MURRAY.